United States Patent [19]
Zanis et al.

[11] 3,734,480
[45] May 22, 1973.

[54] LAMELLAR CRUCIBLE FOR INDUCTION MELTING TITANIUM

[75] Inventors: Charles A. Zanis, Bowie; Richard L. Helferich, Crownsville, both of Md.

[73] Assignee: The United States of America as represented by the Secretary of the Navy, Washington, D.C.

[22] Filed: Feb. 8, 1972

[21] Appl. No.: 224,537

[52] U.S. Cl. .................266/39, 263/48, 266/43
[51] Int. Cl. ................................F27b 14/10
[58] Field of Search ..............263/48; 266/39, 43; 164/52, 68

[56] References Cited
UNITED STATES PATENTS
2,874,953  2/1959  Rogers et al..........................266/43
3,417,808  12/1968  Rosenberg.............................164/68

Primary Examiner—Gerald A. Dost
Attorney—R. S. Sciascia and Q. E. Hodges

[57] ABSTRACT

A lamellar crucible for induction melting titanium has an outer graphite shell closed at one end to form inner and outer surfaces. A first layer generally of the class of refractory metals or of beryllium oxide covers the inner surface of the shell to limit carbon contamination. A second layer is preferably oxygen deficient yttrium oxide and may also be generally of the class of rare earth metal oxides in an oxygen deficient condition. Also, the second layer may be yttrium oxide or the rare earth metal oxides. The second layer covers the first layer to limit reactivity with the molten titanium.

4 Claims, 2 Drawing Figures 3,734,480

3,734,480

LAMELLAR CRUCIBLE FOR INDUCTION MELTING TITANIUM

The invention described herein may be manufactured and used by or for the Government of the United States of America for Governmental purposes without the payment of any royalties thereon or therefor.

BACKGROUND OF THE INVENTION

This invention relates generally to metallurgy and specifically to rare and refractory metals.

DESCRIPTION OF THE PRIOR ART

Since molten titanium dissolves almost all materials, the major problem encountered during melting is containing the liquid metal without picking up contaminants. Several processes have been developed which utilize a solid titanium film or skull on the inside of a liquid-cooled copper crucible. The titanium is melted either by striking an arc between a titanium electrode and the skull, or by melting off a titanium electrode with an energy source such as an electron beam. This skull melting technique has been the primary method used by industry to produce cast titanium components.

Skull melting has several disadvantages which affect the soundness and homogeneity of the resulting castings. The copper crucible maintains a steep thermal gradient across the melt which results in compositional variations within the crucible. Superheating of the melt is limited. Consequently, the molten metal does not possess sufficient fluidity to fill the mold properly and yield a sound casting. The melting process does not impart a sufficient stirring or mixing action in the melt, and compositional heterogeneity may be encountered.

Induction melting is one alternative to skull melting which would lessen the difficulties heretofore known. However, one obstacle to successful induction melting of titanium is the lack of a suitable crucible.

Achievement of a suitable crucible for melting titanium requires both the selection of materials which are not attacked by molten titanium and the development of crucible fabrication techniques which provide a high density interface with the molten metal. A high melting point, favorable electrical properties and high resistance to thermal shock of graphite favor its use as a crucible material. However, the detrimental effects of carbon contamination on the properties of titanium require that coatings or layers be utilized to isolate the graphite from the titanium.

High purity yttrium oxide, $Y_2O_3$, has been found to be substantially resistant to dissolution by molten titanium. However, due to the cost of yttrium, a solid yttrium oxide crucible is not practical. Also, such a crucible has relatively poor thermal shock resistance and thus is not as favorable for induction melting as graphite. Yttrium oxide coated directly on graphite is relatively unfavorable also since the yttrium oxide does not adhere well to graphite. Furthermore, yttrium oxide in direct contact with graphite will break down at certain temperatures causing oxygen to bubble out through the coating and the melt thus contaminating the titanium.

SUMMARY OF THE INVENTION

The present invention provides a suitable crucible for induction melting titanium. This has been accomplished by providing a lamellar crucible comprising a graphite outer shell. A first layer or coating, which may be generally of the class of refractory metals or beryllium oxide, abuts the inner surface of the shell to limit carbon contamination of a second layer and of the molten titanium. The second layer abuts the first layer and is preferably oxygen dificient yttrium oxide and may be generally of the class of rare earth metal oxides in an oxygen deficient condition to limit reactivity with the molten titanium. Also, the second layer may be of yttrium oxide or the rare earth metal oxides. The outer shell is preferably a graphite cylinder of high purity having a substantially low ash content to aid in reducing contaminants which may affect the molten titanium. Also, a low ash content is advantageous since a high ash content would result in the ash burning off rapidly thus causing the eventual breakdown of the graphite. As a result, a low ash content increases the thermal stability of the graphite shell. Additionally, a substantially high density carbon results in more efficient and more even heating of the shell.

OBJECTS OF THE INVENTION

Accordingly, it is an object of the present invention to provide a crucible suitable for induction melting titanium.

It is another object of this invention to provide such a crucible to substantially limit contamination of the molten titanium.

Other objects, advantages and novel features of the invention will become apparent from the following detailed description of the invention when considered in conjunction with the accompanying drawing wherein:

DESCRIPTION OF THE PREFERRED EMBODIMENT

Figures 1, 2:
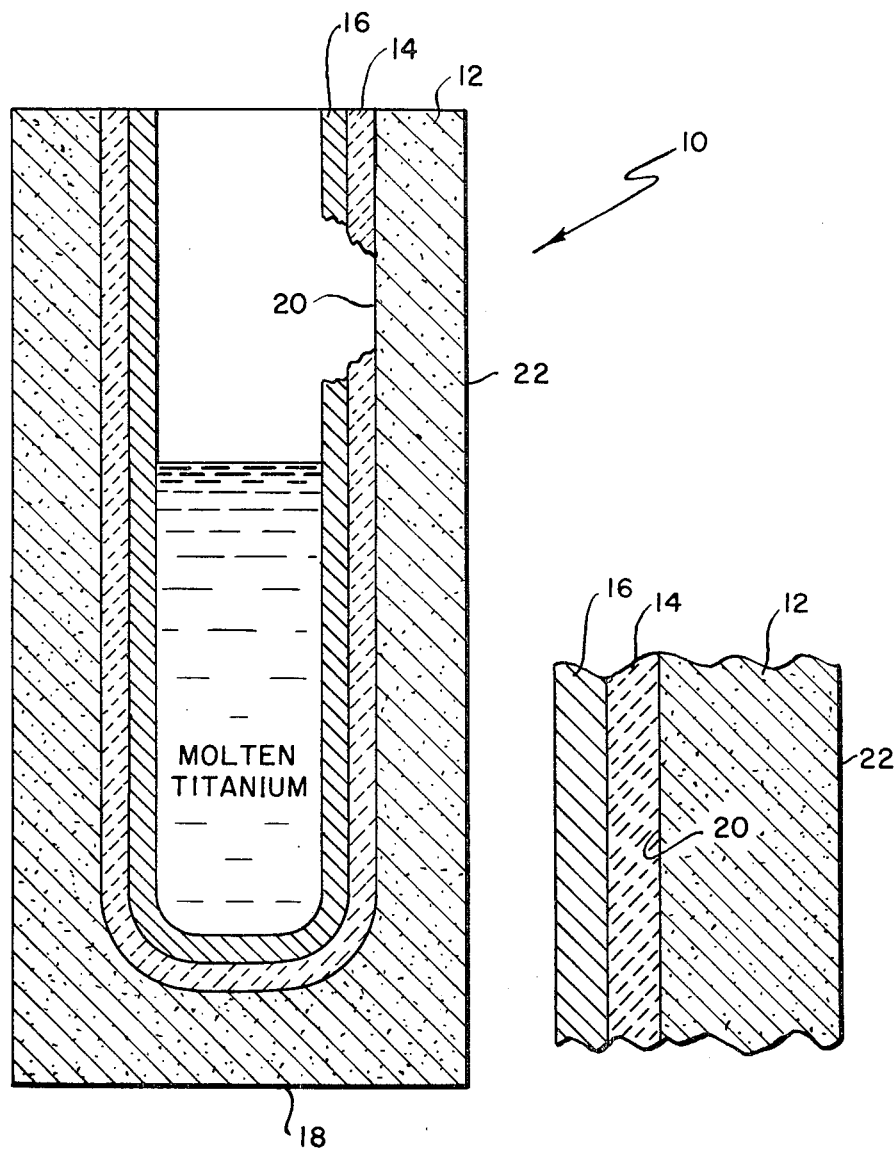
FIG. 1 is a view in cross-sectional elevation illustrating the novel lamellar crucible.
FIG. 2 is an enlarged partial cross-sectional view illustrating the three layers of the crucible of FIG. 1.

Referring now to FIG. 1, the lamellar crucible is generally designated 10 and comprises an outer shell 12, a first layer 14, and a second layer 16, see also FIG. 2.

Shell 12 is preferably formed of machined graphite due to its high melting point, high resistance to thermal shock and favorable electrical properties. However, other suitable materials having similar properties may be used in place of graphite. Shell 12 is generally formed as a cylinder having one end 18 closed. Thus, graphite shell 12 has inner and outer surfaces 20 and 22 respectively.

Preferably, graphite shell 12 has an ash content of less than 0.04 percent. This is important since the percentage of ash in the graphite determines the carbon purity of the graphite. For example, the ash burns off at a lower temperature than the carbon, therefore, if the ash content is high then more ash burns off upon heating of the crucible. As a result, the crucible will eventually suffer a structural breakdown. Also, high ash content affects the thermal stability of the crucible since the gradual burning off of ash affects the crucible qualitatively. Therefore, a relatively highly pure carbon having a low ash content is longer lasting and has substantially greater thermal stability than crucibles having a higher ash content.

If titanium were melted in the graphite crucible, the carbon in the graphite would contaminate the molten titanium. Although a high purity graphite can limit carbon contamination, it cannot eliminate it altogether.

It is also preferred that such a crucible be of substantially high density such as, for example, a density of at least 1.5 grams per cubic centimeter. A crucible of such a density noticeably aids in promoting even and efficient heating and a shorter heating cycle.

As has been stated, carbon contamination cannot be eliminated, therefore, in order to utilize the preferred qualities of a graphite crucible, there is a need to lessen the effects of carbon contamination in the molten titanium. In order to accomplish this, a barrier or coating of suitable material must be used to cover the inner surface 20 of crucible 12 as shown in FIG. 1. A first layer 14 of material selected from the group consisting of tungsten, tantalum, molybdenum, niobium, hafnium, generally known as refractory metals, and also beryllium oxide is provided to cover inner surface 20 of shell 12. The tungsten coating is preferred although each of these materials produce substantially equivalent results, i.e., they limit carbon contamination of both the molten titanium and of a second layer which is directly in contact with the melt.

The second layer 16 is provided to cover the first layer 14 so as to be in direct contact with the molten titanium, see FIG. 1. Layer 16 is of material selected from the group consisting of oxygen deficient yttrium oxide, yttrium oxide, oxygen deficient rare earth metal oxides and rare earth metal oxides. The oxygen deficient yttrium oxide is the preferred coating although each of these materials produce substantially equivalent results, i.e., they are substantially resistant to dissolution by molten titanium. Also, the oxide coating or second coating 16 is out of direct contact with crucible 12 so as to noticeably limit carbon contamination. By oxygen deficient is meant a material which has a greater affinity for oxygen than the same material which is not oxygen deficient. Thus, the second layer of material is preferably oxygen deficient and has a greater affinity for oxygen than the molten titanium so as to limit the oxygen contamination of the melt. The rare earth metal oxides and yttrium oxide in their relatively pure forms may be caused to become oxygen deficient by heating the materials under non-oxidizing conditions such as in an inert or a hydrogen atmosphere or in a vacuum. These conditions will cause the pure oxide to give up oxygen, thus the oxygen deficiency results.

Shell 12 is preferably formed by machining. Firs layer 14 is preferably applied by the electron beam technique. However, layer 14 may be applied by plasma spraying, by other standard powdered metallurgical techniques for coating materials or by an insert. Second layer 16 is preferably plasma sprayed to layer 14, however, layer 16 may be accomplished by slip casting or by an insert of pre-sintered yttrium oxide.

Thus it may be seen from the foregoing that a substantially satisfactory lamellar crucible may be provided for induction melting titanium so as to limit carbon contamination of the melt while utilizing the beneficial and favorable qualities of graphite.

Obviously, many modifications and variations of the present invention are possible in light of the teachings. It is therefore to teachings. It is therefore to be understood that within the of the appended claims the invention may be practiced otherwise than as specifically described.

What is claimed is:

1. A lamellar crucible for induction melting titanium comprising:
   an outer shell closed at one end, said shell having inner and outer surfaces;
   a first layer of material selected from the group consisting of tungsten, tantalum, molybdenum, niobium, hafnium and beryllium oxide covering the inner surface of the shell; and
   a second layer of material selected from the group consisting of oxygen deficient yttrium oxide, yttium oxide, oxygen deficient rare earth metal oxides and rare earth metal oxides covering the first layer.

2. The crucible of claim 1, wherein the outer shell comprises a graphite cylinder.

3. The crucible of claim 2 wherein the graphite has an ash content of less than 0.04 percent.

4. The crucible of claim 3 wherein the graphite has a density of at least 1.5 grams per cubic centimeter.

* * * * *